UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLUE DYE.

SPECIFICATION forming part of Letters Patent No. 609,352, dated August 16, 1898.

Application filed November 9, 1897. Serial No. 657,961. (Specimens.) Patented in Germany December 12, 1892, No. 71,147; in England February 16, 1893, No. 3,487, and in France April 26, 1893, No. 189,359.

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of a New Group of Dyestuffs, (for which Letters Patent were obtained in Germany December 12, 1892, No. 71,147; in Great Britain February 16, 1893, No. 3,487, and in France April 26, 1893, No. 189,359,) of which the following is a specification.

I have found that by condensing the nitroso compounds of dialkylmetaämidophenol with certain sulfo-acids of the naphthylamins and of the anilin and its homologues blue and bluish-violet coloring-matters readily can be obtained, which are suited for dyeing animal fibers in very beautiful shades. Of these I have recognized as especially valuable the coloring-matter which can be obtained by condensing nitrosodiethylmetaämidophenol with alpha-naphthylaminsulfo-acid 1.2', 1.3', or a mixture of these acids, as it can be obtained by nitrating naphthalene-beta-sulfo-acid and reducing the mixture of the nitromonosulfo-acids of naphthalene so obtained to a mixture of the corresponding amidomonosulfo-acids, (Cfr. Cleve, *Bull. de la Soc. Chim.*, Vol. 26, p. 444 and Vol. 29, p. 414,) all of which I hereinafter designate as sulfonated alpha-naphthylamin. The value of the coloring-matter so produced is caused by its very good dyeing properties and because it yields indigo-like shades which are very fast against alkali.

The following is an example of the manner in which my invention can be carried into effect and the new dyestuffs obtained. The parts are by weight. Mix together thoroughly about seventy (70) parts of the hydrochlorate of nitrosodiethylmetaämidaphenol, about fifty (50) parts of 1.3' naphthylaminmonosulfo-acid and about thirty-two (32) parts of crystalized sodium acetate. To the mixture add about one hundred and fifty (150) parts of acetic acid, (containing about sixty per cent. real acid $C_2H_4O_2$.) Heat on the water-bath for about twelve hours or until the melt has assumed a pure blue color and no further formation of coloring-matter can be observed. Dilute the entire product with about three thousand (3,000) parts of water and add, if necessary, just enough soda solution to completely dissolve the coloring-matter, filter, and salt out the dye from the solution. Collect on the filter, wash, press, and dry. In this example the 1.3' naphthylaminsulfo-acid can be replaced by the 1.2' naphthylaminsulfo-acid or by a mixture of these two acids as it can be obtained from the naphthalene-beta-sulfo-acid by nitration and reduction of the resulting nitroderivatives.

The dyestuff produced by condensing the nitrosodiethylmetaämidophenol with alpha-naphthylaminmonosulfo-acid (1.3' or 1.2' or a mixture of these two acids obtained as before described) which I desire to claim specifically herein may be recognized as follows: It is readily soluble in water, giving pure blue shades which are very hardly changed in color by the addition of an alkali. On adding concentrated hydrochloric acid it dissolves with a dirty reddish-brown color approaching black, and on adding concentrated sulfuric acid with a reddish-brown color. It dyes wool in blue shades very fast against alkalies, which are much purer and brighter than those of the "fast-blue" coloring-matter.

Now what I claim is—

1. The blue coloring-matter which can be derived from nitrosodiethylmetaämidophenol and alpha-naphthylaminmonosulfo-acid hereinbefore mentioned, and which is readily soluble in water giving pure blue solutions that are hardly changed in color by the addition of an alkali and giving a dirty reddish-brown color approaching black in concentrated hydrochloric acid and a reddish-brown color in concentrated sulfuric acid all substantially as described.

2. The new process of manufacturing the new dye consisting in condensing the nitrosodiethylmetaämidophenol with alpha-naphthylaminmonosulfo-acid substantially as hereinbefore described.

In testimony whereof I have hereunto set my hand in the presence of two subscribing witnesses.

PAUL JULIUS.

Witnesses:
GUSTAV LICHTENBERGER,
BERNHARD C. HESSE.